United States Patent [19]

Borg et al.

[11] 4,446,379
[45] May 1, 1984

[54] MAGNUS EFFECT POWER GENERATOR

[76] Inventors: John L. Borg; Catherine J. Borg, both of 8200 Toro Creek Rd., Atascadero, Calif. 93422

[21] Appl. No.: 467,220

[22] Filed: Feb. 17, 1983

[51] Int. Cl.³ .......................... F01D 1/36; F03B 5/00; F03D 9/02
[52] U.S. Cl. ......................................... 290/55; 416/4; 416/117
[58] Field of Search .................. 416/4, 117 R; 290/44, 290/55

[56] References Cited

U.S. PATENT DOCUMENTS 1,744,924  1/1930  Sargent .................................. 416/4

Primary Examiner—B. Dobeck
Assistant Examiner—Shelley Wade
Attorney, Agent, or Firm—Harry W. Brelsford

[57] ABSTRACT

Magnus cylinders are mounted for rotation at right angles to shafts that are revolved about a generally vertical axis. The shafts are free to rotate 180°. The Magnus cylinders are continuously rotated in the same angular direction. At one position of revolution of the shafts, the cylinders rotate on an axis generally parallel to the axis of revolution of the shafts. When the apparatus is immersed in a fluid flow (gaseous or liquid) a torque of rotation is developed when the shafts are aligned with the fluid flow, and this torque of rotation is reduced as the shaft approaches a position transverse to the fluid flow. As the shafts pass this transverse position, a torque is developed by the rotating cylinder that rotates the shafts 180° until the formerly downwardly depending cylinder is now upright and the formerly upright cylinder is now downwardly depending on its shaft. With two or more shafts to which cylinders are attached, there is a continuous production of torque about the axis of revolution of the shafts.

7 Claims, 5 Drawing Figures

PLAN

MAGNUS EFFECT POWER GENERATOR

TECHNICAL FIELD

This invention relates to wind and water power generators and has particular reference to a Magnus effect power generator that can be disposed in a fluid flow, either gaseous or liquid, to generate power.

BACKGROUND OF THE PRIOR ART

The Magnus effect was first publicized by Professor G. Magnus in 1853. The phenomenon is well-known in various arts including the curved pitches of baseball and the shooting of airplane guns transversely to the airplane's path of travel. The use of the Magnus effect as a windmill was disclosed in the 1926 translation of Anton Flettner, "The Story of the Rotor," published by F. 0. Willhofft, New York, N.Y. Various patents disclose the use of the Magnus effect for airplane lift, steering a boat, and other use for assisting in submarine steering. Briefly stated, when a rotating cylinder encounters a fluid flow at an angle to its rotational axis, a lifting force is created perpendicularly to the flow direction. If a rotating cylinder is mounted on a vertical axis, a force is developed at right angles to the direction of water flowing past the cylinder, left or right depending upon the direction of rotation. The Magnus effect is therefore ideal for windmills and other fluid flow power generators.

The design of Magnus effect windmills has heretofore been based upon a rotating wheel with Magnus cylinders as spokes, all mounted on tall towers. This has required a rotating head on the tower to point the wind wheel into the wind.

BRIEF SUMMARY OF THE INVENTION

We have devised a Magnus power generator that mounts the rotating cylinders to a mechanism that rotates on a generally vertical axis.

The structure operates efficiently regardless of the direction of the wind or other fluid flow and regardless of quick changes in flow direction. It is omni-directional and is ideal for use in tidal flows where current direction changes four times per day. We employ a flywheel for the rotating mass which causes the mechanism to become more stable as flow velocities increase.

We employ generally vertical rotating cylinders. We further provide a structure that automatically revolves these cylinders to a horizontal position during the non-power phase of revolving these cylinders about the hub. Further, we provide a mechanism for automatically revolving the cylinders 180° so that the same direction of cylinder rotation is maintained whether any particular revolving cylinder is downstream or upstream from the other cylinders.

DETAILED DESCRIPTION OF THE INVENTION

Figure 1:
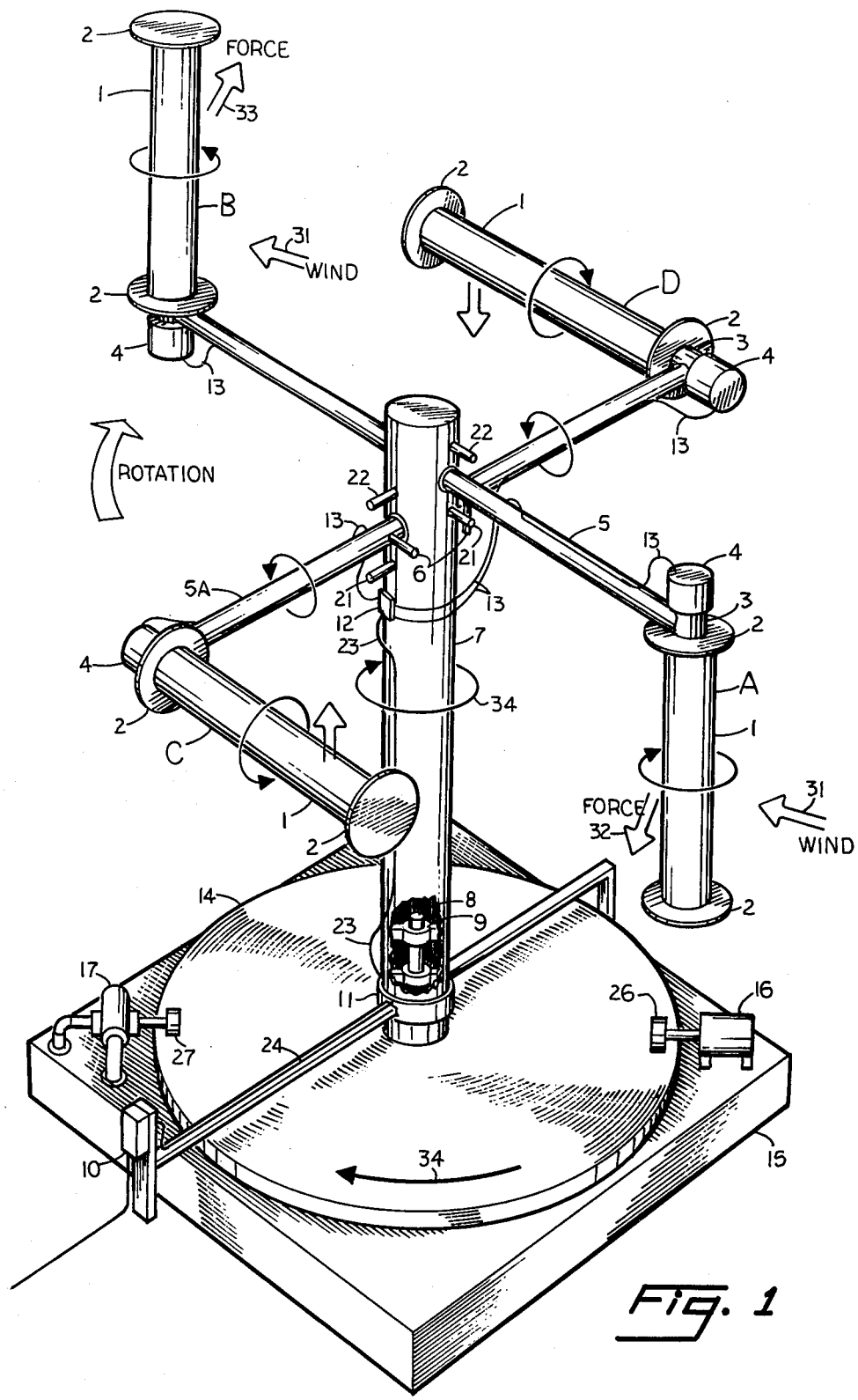
FIG. 1 is a three-dimensional view of a presently preferred form of the invention wherein the Magnus cylinders are at right angles to the fluid flow at the maximum torque positions and are parallel to the flow at the null torque positions.

Referring To FIG. 1, Magnus rotatable cylinders 1 are four in number designated as A, B, C and D. Each cylinder 1 has a circular flange 2 at each end, and are rotated by motors 4 (preferably electric) driving a shaft (not shown) within a bearing housing 3. Each bearing housing 3 is mounted on the end of rotatable shafts 5 and 5A that extend through a central hub 7. The shafts 5 and 5A are limited to approximately 180° of rotation by means of a pins 6 projecting from each shaft which strike lower limit bars 21 and upper limit bars 22.

Power for the motors 4 is supplied by conductors 13 leading to a junction box 12 on the hub 7 and the junction box in turn is supplied by a conductor 23 leading to slip rings 11 surrounding the rotatable hub 7. The slip rings 11 are supplied with current by a conductor 24 leading to a control box 10 which is supplied from any desired source of electric current. The control box 10 controls the speed of rotation of the cylinders 1, and this can be done manually or automatically to maintain any desired instantaneous power output.

The hub 7 is secured to a flywheel 14 and the hub 7 and flywheel 14 in turn are mounted for rotation on a spindle 8 having bearings 9 and the spindle in turn is secured to a base 15.

Any desired power takeoff may be employed and for illustrative purposes only there is shown an electric generator 16 having a friction wheel 26 engaging the flywheel and gearing or any other power takeoff can be used. Illustrated also is a pump 17 operated by the flywheel through a friction wheel 27. Any other suitable mechanical power takeoff can be used and mechanical power can be used for any desired purpose such as operating a sawmill.

OPERATION OF FIG. 1

Figures 3, 4:
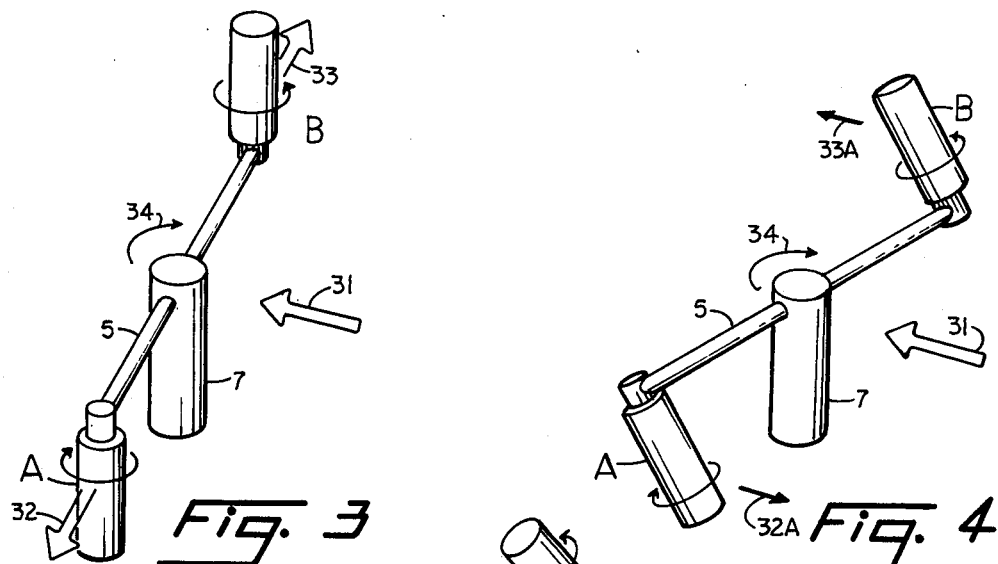
FIG. 3 is a three-dimensional diagram of the rotation of the device of FIG. 1 to a 90° position.
FIG. 4 is a three-dimensional diagram of the structure of FIG. 3 as it passes the 90° position.
Figure 5:
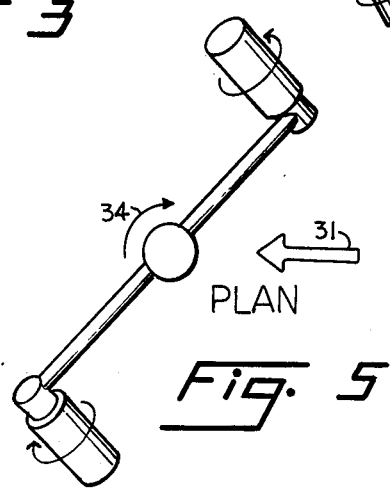
FIG. 5 is a plan view of the diagram of FIG. 4.

The operation of the structure of FIG. 1 is explained with reference to additional FIGS. 3, 4 and 5. The wind direction of FIG. 1 is indicated by arrows 31 and the force generated by the Magnus effect is indicated by arrows 32 for cylinder A and 33 for cylinder B. Cylinders A and B of FIG. 1 have passed the point of maximum torque for the hub 7 which occurs when the cylinders A and B are aligned with the wind direction. As the hub rotates clockwise, indicated by arrows 34, the shaft 5 to which cylinders A and B are connected reaches a position at right angles to the air direction as shown in FIG. 3. The force arrows 32 and 33 are then directly in line with the hub 7 but in opposite directions because the cylinders are rotating in directions opposite to each other. Consequently, no torque is delivered to the hub 7 in the position shown in FIG. 3. This FIG. 3 also shows why it is important to revolve the cylinders A and B to a horizontal position.

As the rotation continues past the wind rightangle of FIG. 3, the Magnus forces 32 and 33 have a component that pulls the shaft 5 in rotation as shown in FIG. 4. This component of the Magnus force is designated as 32A and 33A as shown in FIG. 4. Continued rotation of the hub 7 results in the cylinders A and B assuming the horizontal position of cylinders C and D of FIG. 1. This rotation of shaft 5 is automatic. The hub 7 continues its rotation until the shaft 5 is aligned with the wind direction whereupon the 180° rotation of shaft 5 is completed. The cylinders A and B then assume the positions shown in FIG. 1 and then deliver maximum torque to the hub. As the shaft 5 passes the alignment with the wind direction the torque decreases to zero at the position shown in FIG. 3. However, at this zero torque output position the cylinders C and D have their shaft 5A aligned with the wind at which point they deliver maximum torque to the hub 7. The result is a fairly even delivery of torque to the hub 7 from the four cylinders and any unevenness is smoothed out by the flywheel 14.

The 180° rotation of shaft 5 as the shaft passes the null torque point of FIG. 3, to the position shown in FIG. 1 results in a Magnus effect power generator wherein the Magnus cylinders A, B, C and D rotate continuously in a constant angular direction. If there were no rotation of shafts 5 and 5A then the cylinders would have to be stopped in rotation adjacent to the null position of FIG. 3 and then started up in rotation in the opposite direction to produce torque in the downstream position of cylinder B compared to the upstream position of cylinder A.

From an examination of FIG. 1, 3, 4 and 5, it will be appreciated that the device accommodates to winds of varying directions. The rotation of the shafts 5 and 5A take place just past the null point regardless of wind direction. Therefore, the structure adjusts to gusts of wind wherein there are rapid changes in direction. Furthermore, the use of flywheel smoothes out changes in rotational speed of the hub 7 due to gusts of varying velocity. If there is a complete reversal of wind direction then cylinder B will have its Magnus force in the opposite direction, rotating shaft 5 for an angle of 180° and then rotation of hub 7 will continue in the same direction because cylinder B will now be upstream and depending downwardly from shaft 5 in the same position shown for cylinder A in FIG. 1.

FIG. 2

Figure 2:
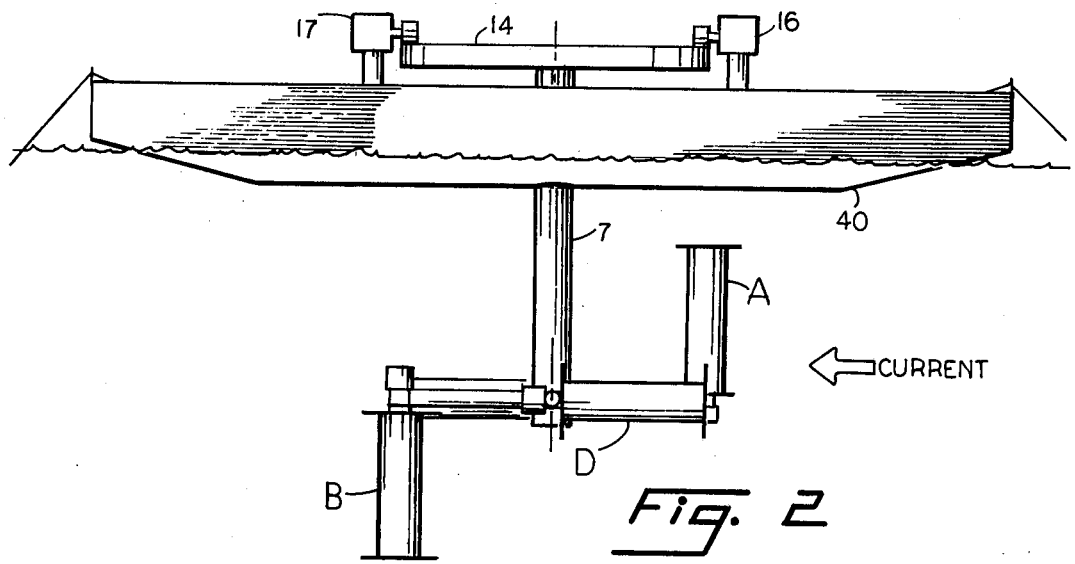
FIG. 2 is a modification wherein a diagram of the apparatus of FIG. 1 is shown as suspended from a barge anchored in a water flow.

Illustrated in FIG. 2 is the apparatus of FIG. 1 suspended from an anchored barge 40 floating in a stream of water which can be a river or can be the inlet and outlet of a bay or the like exposed to tidal currents. The operation is the same in a liquid stream as in the gaseous stream of FIG. 1. The reversal of current flow four times a day in the tidal flow poses no problems because the apparatus is omni-directional as mentioned previously.

INDUSTRIAL APPLICATION

The Magnus power generator can be connected in any desired fashion to an electric generator which may be an isolated generator or may be connected to a multi-state grid to furnish public utility power. If a constant torque is required from the hub 7 under varying wind velocities, this can be accomplished by varying the speed of rotation of the cylinders 1 by control of the motors 4. Similarly, the variation in water velocity of FIG. 2 can be accommodated in the same fashion. The output can be electrical or mechanical, depending upon the need.

It will be apparent to those skilled in the art that various modifications can be made. For example, more than two shafts 5 and 5A could be connected to the hub 7 and at different angles and elevations. The rotational axis of hub 9 need not be vertical and all that is required is that the cylinders be generally transverse to the fluid flow at the maximum torque positions. We include in the following claims all variations and modifications that fall within the true spirit and scope of the invention.

We claim:

1. A Magnus effect power generator for disposition in a fluid flow having a direction comprising:
   (a) a rotatable hub having an axis of rotation;
   (b) a shaft mounted on the hub that is freely rotatable about an axis and mounted in a radial direction to the hub axis and extending out opposite sides of the hub;
   (c) a rotatable cylinder mounted on the shaft on each side of the hub and each having an axis of rotation at right angles to the fluid flow direction when the shaft is aligned with the fluid flow direction;
   (d) means for limiting the rotation of the shaft to approximately 180°;
   (e) and means for rotating the cylinders;
   whereby a fluid flow in said direction creates a Magnus force at right angles to the fluid flow and thereby rotating the hub and whereby revolving the shaft more than 90° past alignment with the flow direction causes 180° rotation of said shaft to invert the cylinders upon the shaft revolving 180° from the fluid flow.

2. A Magnus effect power generator as set forth in claim 1 wherein there is more than one rotatable shaft projecting from each side of the hub, and each shaft has a rotatable cylinder on each side of the hub and has means for limiting the rotation of the shafts to approximately 180° and each has means for rotating the cylinders.

3. A Magnus effect power generator as set forth in claim 1 wherein the means for rotating the cylinders includes an electric motor, and there is added to claim 1,
   (f) means for supplying electric current to the rotatable hub for energizing the electric motor.

4. A Magnus effect power generator as set forth in claim 1 wherein a flywheel is connected to the hub.

5. A Magnus effect power generator for disposition in a fluid flow having a direction comprising:
   (a) a rotatable hub having an axis of rotation;
   (b) a first freely rotatable shaft mounted on the hub and having an axis of rotation radial to said hub axis;
   (c) means to limit the rotation of the shaft to approximately 180°;
   (d) a rotatable cylinder mounted on said shaft and having an axis of rotation at right angles to the fluid flow direction when the shaft is aligned with the fluid flow;
   (e) and means for rotating the cylinder;
   whereby a fluid flow in said direction causes rotation of the hub and causes rotation of the shaft on its axis to dispose the cylinder axis toward the fluid flow direction as the shaft passes 90° of angle to the fluid flow.

6. A Magnus effect power generator as set forth in claim 1 wherein a flywheel is connected to the hub.

7. A Magnus effect power generator as set forth in claim 1 wherein power takeoff means are connected to the hub.

* * * * *